United States Patent
Okai et al.

(10) Patent No.: US 12,306,131 B2
(45) Date of Patent: May 20, 2025

(54) GAS SENSOR

(71) Applicant: NGK SPARK PLUG CO., LTD., Nagoya (JP)

(72) Inventors: Masana Okai, Nagoya (JP); Takehiro Oba, Nagoya (JP); Masaaki Ando, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 791 days.

(21) Appl. No.: 17/283,185

(22) PCT Filed: Mar. 16, 2020

(86) PCT No.: PCT/JP2020/011346
§ 371 (c)(1),
(2) Date: Apr. 6, 2021

(87) PCT Pub. No.: WO2020/213323
PCT Pub. Date: Oct. 22, 2020

(65) Prior Publication Data
US 2021/0349051 A1  Nov. 11, 2021

(30) Foreign Application Priority Data

Apr. 17, 2019  (JP) .................................. 2019-078384

(51) Int. Cl.
*G01N 27/407*  (2006.01)
*G01N 27/406*  (2006.01)
*G01N 27/409*  (2006.01)

(52) U.S. Cl.
CPC ..... *G01N 27/4077* (2013.01); *G01N 27/4062* (2013.01); *G01N 27/4078* (2013.01); *G01N 27/409* (2013.01)

(58) Field of Classification Search
CPC ....... G01N 27/4077; G01N 27/406–41; G01N 33/0004–0075
See application file for complete search history.

(56) References Cited

U.S. PATENT DOCUMENTS 4,857,164 A * 8/1989 Kodachi .............. G01N 27/417
204/406
2001/0054552 A1* 12/2001 Matsuo ................ G01N 27/407
204/422

(Continued)

FOREIGN PATENT DOCUMENTS

CN          101124481 A     2/2008
JP          11-72471 A      3/1999

(Continued)

OTHER PUBLICATIONS

JP 2012-225737 machine translation (Year: 2012).*

(Continued)

*Primary Examiner* — C. Sun
(74) *Attorney, Agent, or Firm* — Leason Ellis LLP; Melvin C. Garner; Mitsuhiro Haraguchi (57) ABSTRACT

A gas sensor is configured to inhibit wear of a metal member contacting with a member containing ceramic. The gas sensor comprising: a first member containing ceramic; and a metal member contacting with the first member, wherein a hardness h1 of a contact part of the metal member contacting with the first member is greater than a hardness h2 of a reference part exhibiting a maximum thickness of the metal member.

6 Claims, 5 Drawing Sheets

(56) References Cited

U.S. PATENT DOCUMENTS

| | | | |
|---|---|---|---|
| 2007/0128955 A1* | 6/2007 | Nishio | H01R 13/03 |
| | | | 439/877 |
| 2007/0202007 A1 | 8/2007 | Augstein et al. | |
| 2009/0183988 A1* | 7/2009 | Imagawa | G01N 27/407 |
| | | | 204/424 |
| 2014/0147913 A1 | 5/2014 | Augstein et al. | |
| 2014/0190829 A1 | 7/2014 | Tabuchi et al. | |
| 2014/0302726 A1* | 10/2014 | Adachi | G01N 27/4062 |
| | | | 29/863 |

FOREIGN PATENT DOCUMENTS

| | | |
|---|---|---|
| JP | 2007-535660 A | 12/2007 |
| JP | 2009-192523 A | 8/2009 |
| JP | 2012-225737 A | 11/2012 |
| WO | WO-2013/065270 A1 | 5/2013 |

OTHER PUBLICATIONS

International Search Report mailed Jun. 16, 2020 for the corresponding PCT International Patent Application No. PCT/JP2020/011346.

Chinese Office Action dated Nov. 16, 2023 for the corresponding Chinese Patent Application No. 202080020057.1 (15 pages including English translation).

\* cited by examiner

GAS SENSOR

CROSS-REFERENCE TO RELATED PATENT APPLICATIONS

This application is a U.S. National Phase Application under 35 U.S.C. § 371 of International Patent Application No. PCT/JP2020/011346 filed on Mar. 16, 2020 and claims the benefit of priority to Japanese Patent Applications No. 2019-078384 filed on Apr. 17, 2019, all of which are incorporated herein by reference in their entireties. The International Application was published in Japanese on Oct. 22, 2020 as International Publication No. WO/2020/213323 under PCT Article 21 (2).

FIELD OF THE INVENTION

The present invention relates to a gas sensor that has a member containing ceramic and detects the concentration of a specific gas component.

BACKGROUND OF THE INVENTION

As a gas sensor for improving fuel efficiency and performing combustion control for an internal combustion engine such as an automobile engine, there are known an oxygen sensor and an air/fuel ratio sensor which detect the oxygen concentration in exhaust gas.

Such a gas sensor generally adopts a structure in which a sensor element for detecting the concentration of a specific gas is held in a metal shell, and electrode take-out portions (electrode pads) provided on the rear-side surface of the sensor element are surrounded by a tubular ceramic separator. Metal terminals attached to the separator are electrically connected to the respective electrode pads of the sensor element, a grommet made of rubber is provided on the rear side relative to the separator, and the separator and the grommet are surrounded by an outer tube made of metal. Lead wires are connected to the metal terminals, and the lead wires are led to the outside through through-holes in the grommet.

Figure 9:
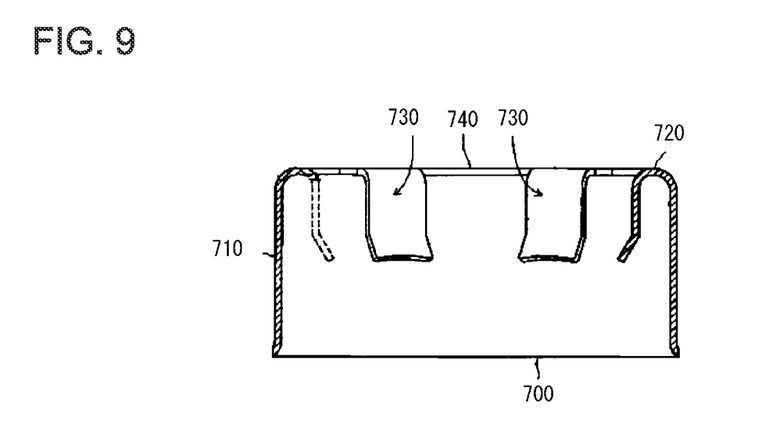
FIG. 9 is a sectional view of a metal holder in conventional art.

Here, as shown in FIG. 9, an annular metal holder 700 is provided between the separator and the outer tube. The metal holder 700 has a tubular portion 710 and a plurality of inner extending portions (spring pieces) 730 folded from the tubular portion 710 toward the radially inner side via a folded portion 720. The inner extending portions 730 contact with the outer side surface of the separator so as to elastically hold the separator in the tubular portion (Japanese Patent Application Laid-Open (kokai) No. 2012-225737). The metal holder 700 has horizontally extending support portions 740 formed between the adjacent inner extending portions 730.

Figure 10:
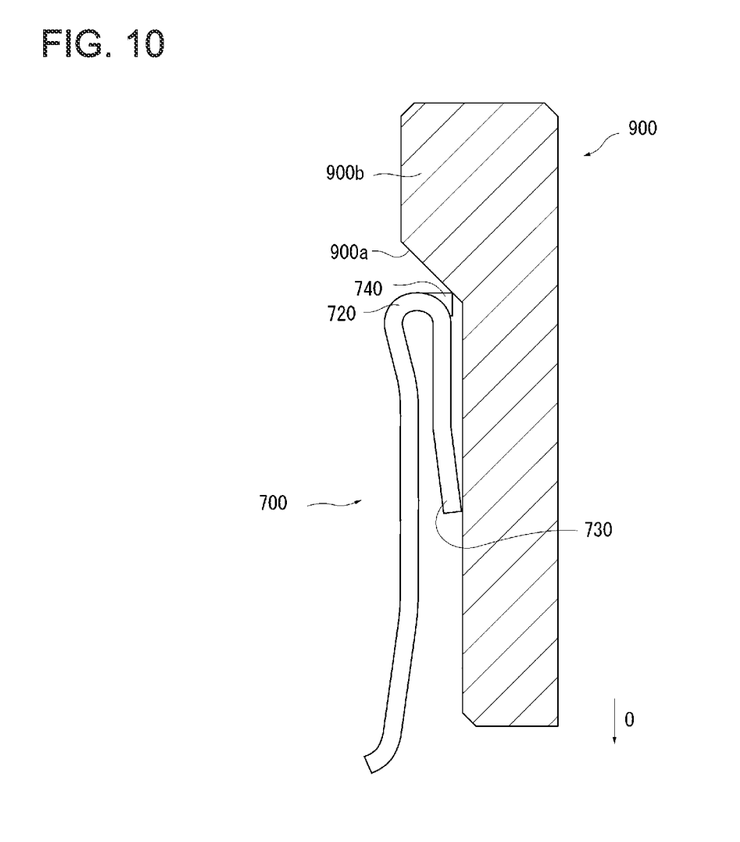
FIG. 10 is a sectional view along the axial-line direction, showing an engagement state between a separator and the metal holder in conventional art.

As shown in FIG. 10, a front facing surface 900a of a flange portion 900b of a separator 900 contacts with the support portions 740 of the metal holder 700, and a rear facing surface of the separator 900 is engaged with the grommet or the outer tube, whereby the front and rear sides of the separator are fixed in the outer tube.

PRIOR ART DOCUMENT

Patent Document

Patent Document 1: Japanese Patent Application Laid-Open (kokai) No. 2012-225737

Problem to be Solved by the Invention

The separator 900 made of ceramic is harder than the metal holder 700 made of metal. Therefore, there is a problem that, of the metal holder 700, the support portions 740 which are contact parts with the separator 900 are worn due to vibration or the like during usage of the sensor.

When the support portions 740 are worn, the force for the metal holder 700 to hold the separator 900 is reduced.

Further, metal members in the gas sensor are under an environment to be always subjected to vibration. If a contact part thereof with another member (first member) is worn, the function of the metal member for contact, holding, or the like might be impaired. For example, in a metal terminal electrically connected by contacting with a gas sensor element by spring property of the metal terminal, if the contact part is worn, the deformation amount of the metal terminal when the metal terminal contacts with the counterpart member becomes small. Thus, the contact pressure by a reaction force due to spring property is weakened, which might lead to unstable electric connection.

Accordingly, an object of the present invention is to provide a gas sensor that can inhibit wear of a metal member contacting with a member containing ceramic.

SUMMARY OF THE INVENTION

Means for Solving the Problem

In order to solve the above problem, a gas sensor of the present invention is a gas sensor comprising: a first member containing ceramic; and a metal member that has a contact part contacting the first member and a reference part exhibiting a maximum thickness of the metal member, wherein a hardness h1 of the contact part is greater than a hardness h2 of the reference part.

The reference part exhibiting the maximum thickness of the metal member is not subjected to working such as flat press for forming the contact part, for example, whereby the reference part is less work-hardened than the contact part and thus the hardness of the reference part can be lowered. On the other hand, the contact part is more worked than the reference part, for example, whereby the contact part is further work-hardened so as to increase in hardness.

As described above, by setting h1>h2, even when the contact part of the metal member contacts with the hard first member containing ceramic, since the contact part is harder than the other part of the metal member, wear of the contact part due to vibration or the like during usage of the sensor can be inhibited.

In the gas sensor element of the present invention, a thickness t1 of the contact part may be smaller than a thickness t2 of the reference part.

According to this gas sensor, owing to the thickness t1 of the contact part being smaller than the thickness t2 of the reference part, the degree of work hardening of the contact part can be assuredly made higher than that of the reference part, and therefore, h1>h2 can be assuredly satisfied.

In the gas sensor element of the present invention, the first member may be a separator made of ceramic, and the metal member may be a metal holder holding the first member.

According to this gas sensor, the present invention can be effectively applied to the metal holder which is readily worn due to vibration or the like during usage.

In the gas sensor element of the present invention, the metal holder may include a tubular portion surrounding an outer side surface of the separator, an outer bent portion connected to a rear end of the tubular portion along a circumferential direction, and bent so as to reduce in diameter toward a radially inner side, a plurality of support portions connected to an end on the radially inner side of the outer bent portion, so as to be spaced from each other in the circumferential direction, the support portions extending toward the radially inner side and supporting the separator in an axial direction of the metal holder, and a plurality of inner extending portions connected to the end on the radially inner side of the outer bent portion, and each of the plurality of inner extending portions being located between two of the support portions adjacent in the circumferential direction, having inner bent portions bent toward a front side in the axial direction, and holding the separator in the radial direction by having end portions contact the outer side surface of the separator, and at least either of end portions of the support portions and the end portions of the inner extending portions may form the contact part.

According to this gas sensor, wear of the end portions of the support portions and the end portions of the inner extending portions which are readily worn in the metal holder configured as described above can be effectively inhibited.

In the gas sensor element of the present invention, the metal holder may be a disc spring, and an inner circumferential end on a projecting surface side thereof may form the contact part.

According to this gas sensor, even when the metal holder is a disc spring, wear thereof can be effectively inhibited.

In the gas sensor element of the present invention, the first member may be an electrode pad containing ceramic and a noble metal, and the metal member may be a metal terminal electrically connected to the first member.

According to this gas sensor, the present invention can be effectively applied to the metal terminal which is readily worn due to vibration or the like during usage.

A method for manufacturing a gas sensor of the present invention is a method for manufacturing a gas sensor, the gas sensor including a first member made of ceramic, and a metal member contacting with the first member, the method comprising: a step of shaping a metal plate material to obtain an unhardened metal member; a step of obtaining the metal member by performing press work on a part of the unhardened metal member to be a contact part contacting with the first member, so that a hardness h1 of the part to be the contact part becomes greater than a hardness h2 of a reference part exhibiting a maximum thickness of the metal member; and a step of assembling the first member and the metal member so as to contact with each other at the contact part.

According to this method for manufacturing the gas sensor, the metal member satisfying h1>h2 can be assuredly obtained from a plate material.

Advantageous Effects of the Invention

According to the present invention, a gas sensor that can inhibit wear of a metal member contacting with a member containing ceramic can be obtained.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Hereinafter, an embodiment of the present invention will be described.

Figure 1:
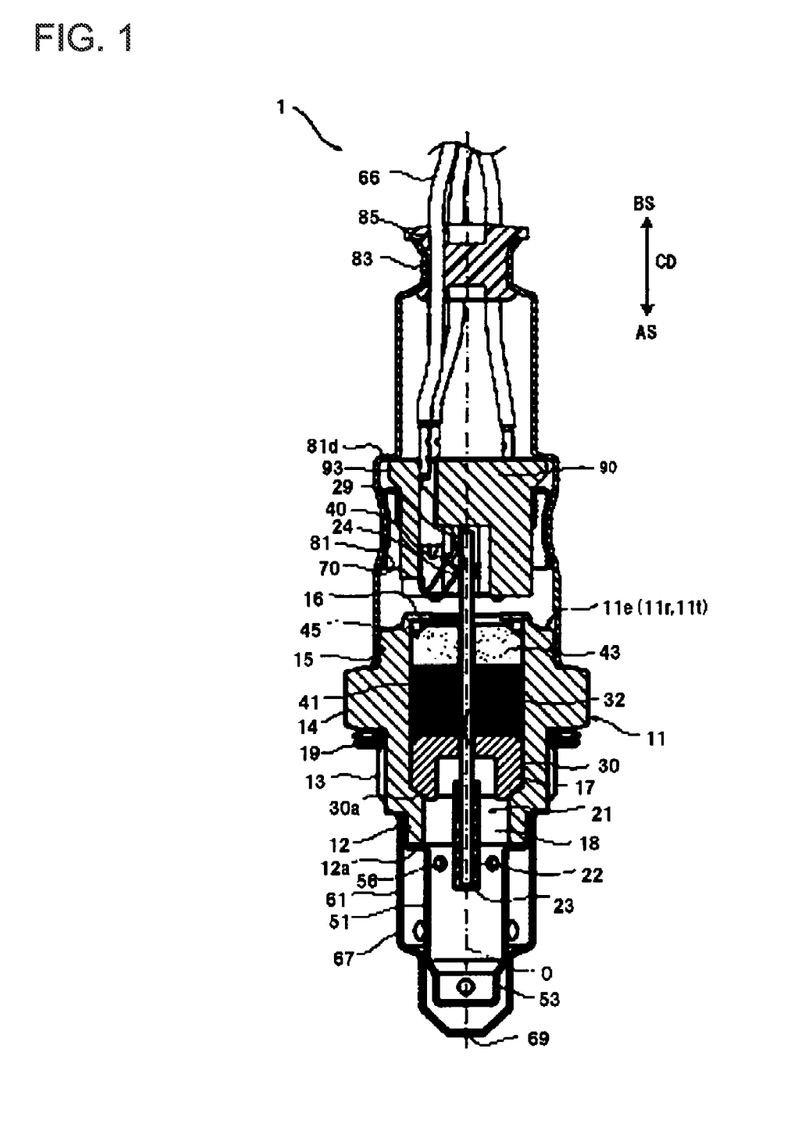
FIG. 1 is a sectional view along an axial-line direction of a gas sensor according to an embodiment of the present invention.
Figure 2:
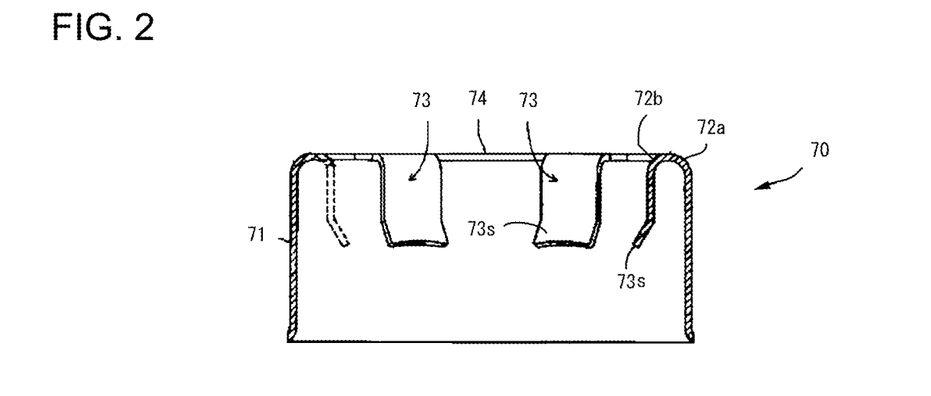
FIG. 2 is a sectional view of a metal holder.
Figure 3:
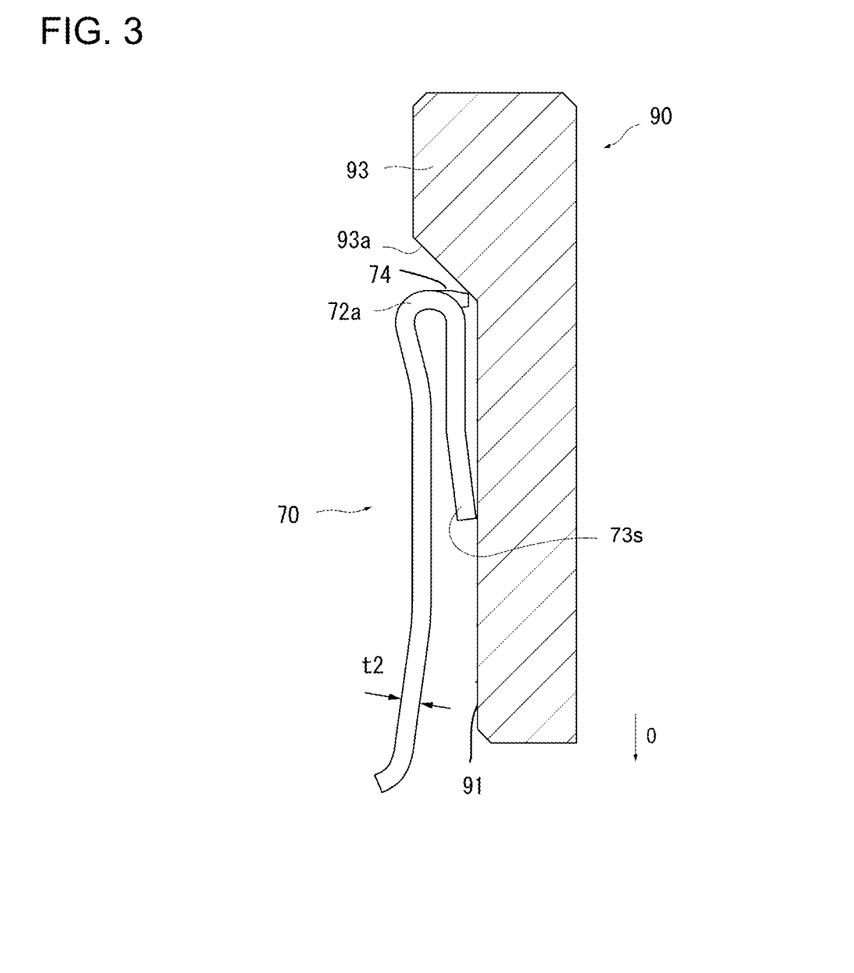
FIG. 3 is a sectional view along the axial-line direction, showing an engagement state between a separator and the metal holder.
Figure 4:
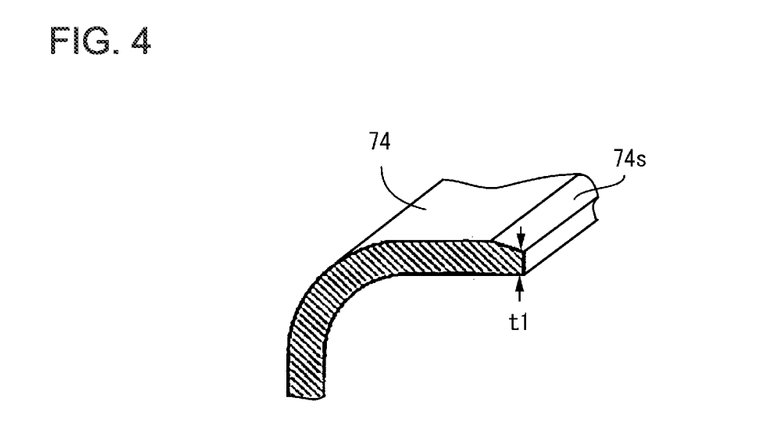
FIG. 4 is a sectional view of a support portion of the metal holder.

First, with reference to FIG. 1 to FIG. 4, a gas sensor (full-range air/fuel ratio sensor) 1 according to the embodiment of the present invention will be described. FIG. 1 is a sectional view along the direction of an axial line O of the gas sensor 1, FIG. 2 is a sectional view of a metal holder 70, FIG. 3 is a sectional view showing an engagement state between a separator 90 and the metal holder 70, and FIG. 4 is a sectional view of a support portion 74 of the metal holder 70. In FIG. 1, the lower side (side where a detection portion 22 of a sensor element 21 is located) is referred to as "front side", and the upper side (side where electrode take-out portions (electrode pads) 24 of the sensor element 21 are located) is referred to as "rear side".

The gas sensor 1 includes the sensor element 21, a ceramic holder 30 having a through-hole 32 which penetrates in the direction of the axial line O and through which the sensor element 21 is inserted, and a metal shell 11 surrounding the circumference in the radial direction of the ceramic holder 30.

Of the sensor element 21, a front-side part where the detection portion 22 is formed protrudes frontward of the ceramic holder 30. Thus, the sensor element 21 passing through the through-hole 32 is fixed while being kept in an airtight state in the front-rear direction inside the metal shell 11 by compressing a seal material (in this example, talc) 41 provided on the rear facing surface side of the ceramic holder 30 in the front-rear direction via a ring washer 45 and a sleeve 43 made of an insulating material.

A rear-end-29-side part including a rear end 29 of the sensor element 21 protrudes rearward of the sleeve 43 and the metal shell 11, and metal terminals 40 provided at front ends of lead wires 66 led to the outside through an elastic seal member (grommet) 85 are pressed in contact with the respective electrode pads 24 formed at the rear-end-29-side part, so as to be electrically connected thereto.

The rear-end-29-side part of the sensor element 21 including the electrode pads 24 is covered with an outer tube 81.

The sensor element 21 has a band plate shape (plate shape) extending in the direction of the axial line O, and has, at the front side directed to a measurement target, the detection portion 22 which includes a detection electrode and the like (not shown) and detects a specific gas component in a detection target gas. The sensor element 21 has a rectangular cross section of which the size is constant along the front-rear direction, and is formed mainly from ceramic (solid electrolyte, etc.) in a thin long shape. The sensor element 21 itself is the same as a conventionally known one, in which a pair of detection electrodes forming the detection portion 22 are provided at a front-side part of a solid electrolyte (member), and continuously therefrom, the electrode pads 24 connected to the lead wires 66 for taking out a detection output are formed at a rear-side part in an exposed state.

In this example, a heater (not shown) is provided inside a front-side part of a ceramic material layered on a solid electrolyte (member), of the sensor element 21, and the electrode pads 24 connected to the lead wires 66 for applying voltage to the heater are formed at a rear-side part in an exposed state.

Although not shown, these electrode pads 24 each have a rectangular shape long in the direction of the axial line O, and three or two electrode pads 24 are arranged in the width direction at the rear-end-29-side part of the sensor element 21, for example.

The detection portion 22 is coated with a porous protection layer 23 made of alumina, spinel, or the like.

The metal shell 11 has a tubular shape concentric and different in diameter between the front side and the rear side. On the front side, the metal shell 11 has a small diameter and has a cylindrical annular portion (hereinafter, may be referred to as cylindrical portion) 12 to which protectors 51, 61 described later are externally fitted and fixed, and on an outer circumferential surface rearward thereof, the metal shell 11 has a thread 13 which has a larger diameter than the cylindrical annular portion 12, and which is fixed to an exhaust pipe of an engine. At the rear side of the thread 13, the metal shell 11 has a polygonal portion 14 to be used for screwing the sensor 1 by the thread 13.

At the rear side of the polygonal portion 14, contiguously thereto, the metal shell 11 has a cylindrical portion 15 to which the protection tube (outer tube) 81 for covering the rear part of the gas sensor 1 is externally fitted and welded, and at the rear side thereof, the metal shell 11 has a thin crimping cylindrical portion 16 having a smaller outer diameter than the cylindrical portion 15. In FIG. 1, the crimping cylindrical portion 16 is already crimped so as to be bent inward. A gasket 19 for sealing at the time of screwing is attached to the front facing surface of the polygonal portion 14.

The metal shell 11 has an inner hole 18 penetrating in the direction of the axial line O, and the inner circumferential surface of the inner hole 18 has a taper-shaped step portion 17 tapered inward in the radial direction from the rear side toward the front side.

On the inner side of the metal shell 11, the ceramic holder 30 made of insulating ceramic (e.g., alumina) and having a substantially short cylindrical shape is provided. The ceramic holder 30 has a taper-shaped front facing surface 30a tapered toward the front side. An outer-circumferential-side part of the front facing surface 30a is engaged with the step portion 17 and the ceramic holder 30 is pressed by the seal material (talc) 41 from the rear side, whereby the ceramic holder 30 is clearance-fitted and positioned inside the metal shell 11.

The ceramic holder 30 has the through-hole 32 at the center thereof. The through-hole 32 has a rectangular opening with almost the same dimensions as the cross section of the sensor element 21 so that the sensor element 21 passes with almost no gap therebetween.

The sensor element 21 is inserted through the through-hole 32 of the ceramic holder 30 so that the front end of the sensor element 21 protrudes toward the front side relative to the ceramic holder 30 and a front end 12a of the metal shell 11.

A front part of the sensor element 21 is covered with bottomed cylindrical protectors (protection covers) 51, 61 respectively having vent holes 56, 67 and formed in a double-layer structure in this example. Of these, the rear end of the inner protector 51 is externally fitted and welded to the cylindrical portion 11 of the metal shell 11. The vent holes 56 are provided at, for example, eight locations in the circumferential direction on the rear side of the protector 51. Exhaust holes 53 are provided at, for example, four locations in the circumferential direction on the front side of the protector 51.

The outer protector 61 is externally fitted to the inner protector 51 and welded to the cylindrical portion 12. The vent holes 67 of the outer protector 61 are provided at, for example, eight locations in the circumferential direction in a front-side part. One discharge hole 69 is provided at the center of the front bottom portion of the protector 61.

As shown in FIG. 1, the metal terminals 40 provided at the front ends of the lead wires 66 are pressed in contact with the electrode pads 24 of the sensor element 21 by spring property of the metal terminals 40, so as to be electrically connected thereto.

The metal terminals 40 including the pressed contact portions are arranged so as to be opposed respectively in a storage portion provided in the separator 90 made of insulating ceramic and provided in the outer tube 81.

Movement of the separator 90 in the radial direction and in the frontward direction is restricted by the metal holder 70 crimped and fixed in the outer tube 81. The front end portion of the outer tube 81 is externally fitted and welded to the cylindrical portion 15 which is a rear-side part of the metal shell 11, whereby the rear side of the gas sensor 1 is covered in an airtight state.

The lead wires 66 are led to the outside through the elastic seal member 85 provided inside the rear end portion of the outer tube 81, and a small-diameter tubular portion 83 of the outer tube 81 is crimped in a diameter reducing manner so as to compress the elastic seal member 85, whereby this part is kept in an airtight state.

The separator 90 and the metal holder 70 respectively correspond to a "first member" and a "metal member" in the claims.

The outer tube 81 has, at a slightly rear side relative to the center in the direction of the axial line O, a step portion 81d having a larger diameter on the front side. An inner surface of the step portion 81d is engaged with the rear end of the separator 90.

The separator 90 has a large-diameter flange 93 on the rear side thereof. The rear facing surface of the metal holder 70 surrounding the separator 90 is engaged with the flange 93, and thus the separator 90 is held in the direction of the axial line O by the step portion 81d and the metal holder 70.

As shown in FIG. 2, the metal holder 70 is formed by, for example, pressing or bending one metal plate material (e.g., SUS 304), and has a tubular portion 71 having a substantially cylindrical shape and surrounding an outer side surface 91 of the separator 90, and a plurality of (in this example, six) inner extending portions 73 arranged at regular intervals in the circumferential direction and each extending frontward via an outer bent portion 72a and an inner bent portion 72b folded radially inward from the rear edge of the tubular portion 71. A plurality of (in this example, six) support portions 74 extending radially inward from the outer bent portion 72a in parallel to the radial direction are provided between the inner extending portions 73 adjacent in the circumferential direction.

The outer bent portion 72a is connected to the rear end of the tubular portion 71 along the circumferential direction, and is bent so as to reduce in diameter inward in the radial direction.

The support portions 74 are connected to the radially inner end of the outer bent portion 72a so as to be spaced from each other in the circumferential direction.

The inner extending portions 73 are connected to the radially inner end of the outer bent portion 72a and have the inner bent portions 72b bent frontward in the axial direction.

As shown in FIG. 3, the folded portion 72 side of the metal holder 70 is fitted to the front side of the separator 90, so that the support portions 74 contact with a front facing surface 93a of the flange 93, thereby supporting the separator 90 in the axial direction of the metal holder 70. In addition, front end portions 73s of the inner extending portions 73 contact with the outer side surface 91 of the separator 90, thereby grasping the separator 90 in the radial direction, and thus, owing to an elastic force of the inner extending portions 73, impact on the outer tube 81 is prevented from being directly transferred to the separator 90.

Here, as shown in FIG. 4, a radially inner end portion 74s of the support portion 74 is tapered and the thickness at the end edge thereof is t1. The end portion 74s forms a contact part to contact with the separator 90 (front facing surface 93a thereof).

On the other hand, as shown in FIG. 3, where the thickness of a reference part exhibiting the maximum thickness of the metal holder 70 is denoted by t2, a hardness h1 of the end portion 74s (a contact surface thereof with the separator 90, on the upper surface side in FIG. 4) is greater than a hardness h2 of the reference part.

The reference part exhibiting the maximum thickness of the metal holder 70 is not subjected to working such as flat press for forming the contact part, for example, whereby the reference part is less work-hardened than the contact part and thus the hardness of the reference part can be lowered. On the other hand, the end portion 74s is more worked than the reference part through flat press or the like, for example, whereby the end portion 74s is further work-hardened so as to increase in hardness.

The reference part does not mean a part not subjected to work hardening at all. As long as the reference part is not subjected to the work hardening for forming the end portion 74s, the reference part may be subjected to less work hardening than for the end portion 74s.

As described above, by setting h1>h2, even when the end portion 74s of the metal holder 70 contacts with the hard separator 90 made of ceramic, since the end portion 74s is harder than the other part of the metal holder 70, wear of the end portion 74s due to vibration or the like during usage of the sensor can be inhibited.

The hardness h1, h2 can be measured by, for example, a micro Vickers hardness tester, in accordance with the condition of "Micro Vickers hardness test" in "JIS-Z2244 Vickers hardness test-Test method". The contact part of the metal holder 70 can be specified from a sectional photograph of the sensor 1.

In the example in FIG. 3 and FIG. 4, only the end portion 74s of the support portion 74 is set to satisfy h1>h2 as a contact part. However, since the end portion 73s of the inner extending portion 73 also contacts with the separator 90, the end portion 73s may be similarly subjected to work hardening or the like as a contact part so as to satisfy h1>h2. It is noted that, since the end portion 73s elastically contacts with the separator 90, the end portion 73s is less likely to be worn as compared to the support portion 74. Therefore, in this example, only the end portion 74s of the support portion 74 is set as h1>h2.

In the example in FIG. 3 and FIG. 4, the end edge of the end portion 74s forms a contact part. However, the contact part may be formed on the radially outer side relative to the end edge of the end portion 74s, and essentially, h1>h2 only has to be satisfied.

In this example, t1 is smaller than t2. Thus, owing to the thickness t1 of the contact part being smaller than the thickness t2 of the reference part, the degree of work hardening or the like of the contact part can be assuredly made higher than that of the reference part as described below, and therefore, h1>h2 can be assuredly satisfied.

Figure 5:
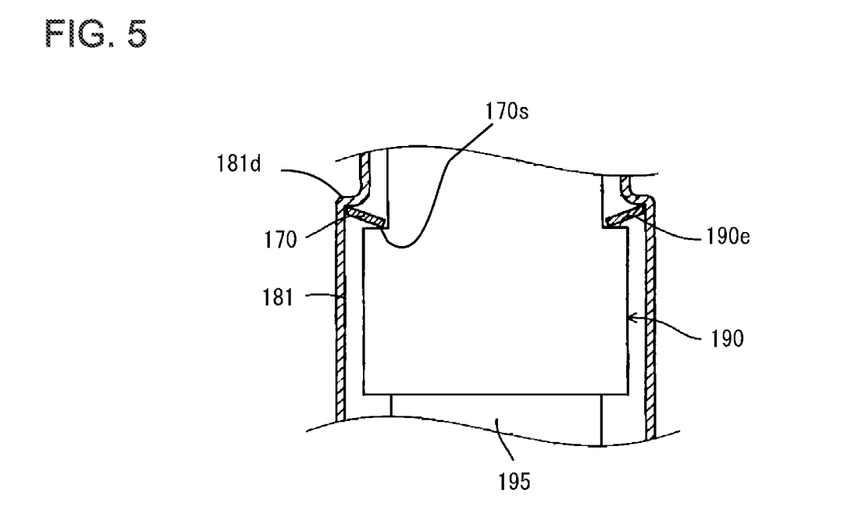
FIG. 5 is a partial sectional view showing an engagement state between a separator and a metal holder in a modification.
Figure 6:
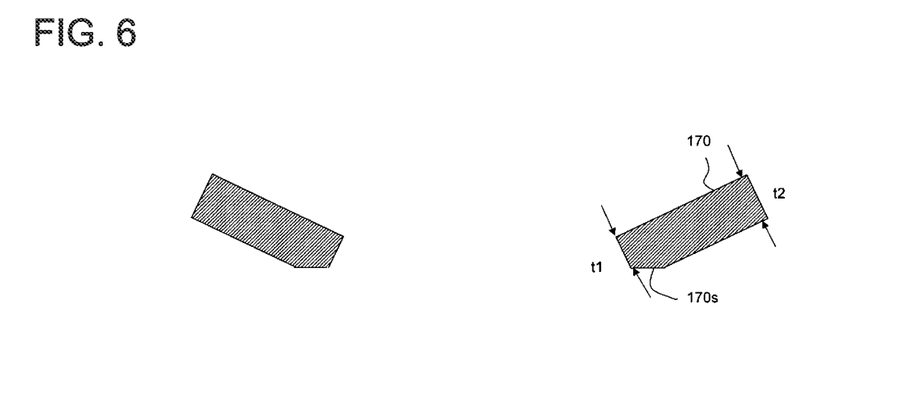
FIG. 6 is a sectional view of the metal holder in the modification.

Next, with reference to FIG. 5 and FIG. 6, a modification of a metal holder will be described. FIG. 5 is a partial sectional view showing an engagement state between a separator 190 and a metal holder 170, and FIG. 6 is a sectional view of the metal holder 170. In the example in FIG. 5, only a partial sectional view around the separator 190 and the metal holder 170 along the axial-line direction of the gas sensor is shown. The other configurations of the gas sensor are the same as those in FIG. 1, and therefore are not shown.

As shown in FIG. 5, a step portion 190e having a larger diameter on the front side is formed on the rear side of the separator 190. Also on the rear side of the outer tube, a step portion 181d having a larger diameter on the front side is formed. A ceramic holder 195 contacts with the front side of the separator 190.

The separator 190 is provided in the outer tube 181, and a disc spring 170 of which the projecting surface side faces the front side is provided as a holding member at the inner surface of the step portion 181d of the outer tube 181. An inner circumferential end 170s on the projecting surface side of the disc spring 170 contacts with the step portion 190e of the separator 190, so as to form a contact part.

Thus, the separator 190 is held in the direction of the axial line O by the ceramic holder 195 and the disc spring 170. The disc spring 170 is deflected in the direction of the axial line O so as to elastically hold the separator 90.

Here, as shown in FIG. 6, the inner circumferential end 170s is tapered toward the inner edge, and the end edge thereof has a thickness of t1. Where the thickness of the reference part exhibiting the maximum thickness of the disc spring 170 is denoted by t2, t1 is smaller than t2, and a hardness h1 of the inner circumferential end 170s (the contact surface thereof with the separator 190, on the lower surface side in FIG. 6) is greater than a hardness h2 of the reference part.

The reference part of the disc spring 170 corresponds to the maximum thickness, i.e., the original thickness of the plate material for forming the disc spring 170, and thus can be considered not to be subjected to work hardening. On the other hand, since the thickness t1 of the inner circumferential end 170s is smaller than t2, the inner circumferential end 170s is a work-hardened part obtained by working the original plate material having the thickness t2 through flat press or the like.

Thus, even when the inner circumferential end 170s of the disc spring 170 contacts with the hard separator 190 made of ceramic, since the inner circumferential end 170s is harder than the other part of the disc spring 170, wear of the inner circumferential end 170s due to vibration or the like during usage of the sensor can be inhibited.

Next, with reference to FIG. 7 and FIG. 8, the case where the electrode pad 24 and the metal terminal 40 in the gas sensor 1 shown in FIG. 1 respectively correspond to the "first member" and the "metal member" in the claims, will be described.

Figure 7:
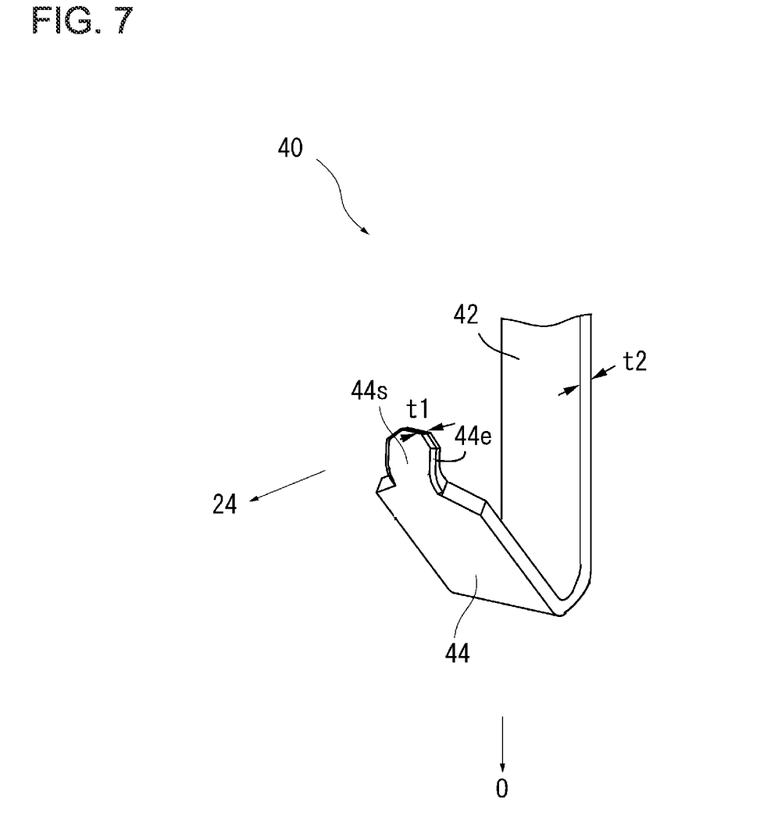
FIG. 7 is a partial perspective view of a metal terminal.
Figure 8:
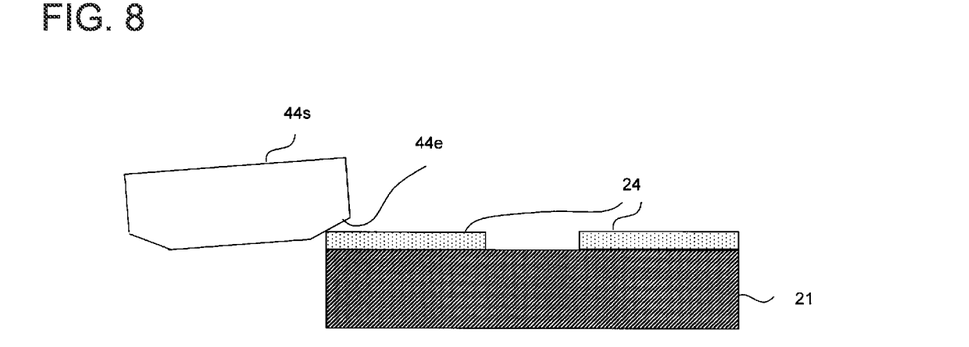
FIG. 8 is a view showing a contact state between an electrode pad and the metal terminal.

FIG. 7 is a partial perspective view of the metal terminal 40, and FIG. 8 is a view showing a contact state between the electrode pad 24 and the metal terminal 40. FIG. 8 is a view as seen from the rear side.

The electrode pad 24 is formed by sintering a paste of a mixture of conductive particles such as Pt and a ceramic (such as alumina) component which is a main component of the sensor element 21. Therefore, the electrode pad 24 is a member "containing ceramic", and is harder than the metal member.

On the other hand, the metal terminal 40 is formed in a known shape extending in the direction of the axial line O as a whole, and integrally has a crimp portion (not shown) to be connected with the lead wire 66 by crimping, a substantially plate-shaped body portion 42 connected to the front side of the crimp portion, and an element contacting portion 44 folded toward the sensor element 21 from the front side of the body portion 42.

The metal terminal 40 can be manufactured by stamping one metal plate (INCONEL (registered trademark), etc.) and then bending the stamped metal plate into a predetermined shape, for example.

The element contacting portion 44 is folded from the front end of the body portion 42 to the rear side toward the sensor element 21, and an end portion 44s of the element contacting portion 44 is elastically connected to the electrode pad 24 (see FIG. 8), to form a contact part.

The end portion 44s protrudes from the element contacting portion 44 so as to have a reduced width, and has, on both side surfaces, taper-shaped slope surfaces 44e tapered toward the opposite side of the thickness direction.

Here, if the thickness of the reference part exhibiting the maximum thickness of the metal terminal 40 is t2 and the thickness of the end portion 44s is t1 which is smaller than t2, the original plate material having the thickness t2 is subjected to working such as flat press, to form the work-hardened end portion 44s. Thus, the hardness h1 of the end portion 44s (the contact surface thereof with the electrode pad 24) becomes higher than the hardness h2 of the reference part.

Thus, even when the end portion 44s contacts with the hard electrode pad 24 containing ceramic, since the end portion 44s is harder than the other part of the metal terminal 40, wear of the end portion 44s due to vibration or the like during usage of the sensor can be inhibited.

Normally, the main surface of the end portion 44s contacts with the electrode pad 24 so as to rightly face thereto. However, as shown in FIG. 8, in some cases, the metal terminal 40 is displaced in the width direction relative to the electrode pad 24, and thus has one-side contact with the electrode pad 24 by a side end of the end portion 44s.

Therefore, instead of making the thickness of the end portion 44s itself smaller than t2 (or in addition to making the thickness of the end portion 44s itself smaller), if the thickness of the slope surface 44e forming a side surface of the end portion 44s is made smaller than t2, the slope surface 44e is hardened and thus wear thereof can be inhibited even when the slope surface 44e becomes a contact part due to one-side contact.

Next, a method for manufacturing the gas sensor 1 according to an embodiment of the present invention will be described.

Manufacturing of the metal holder 70 includes a step of shaping a metal plate material to obtain an unhardened metal member, and a step of performing press work on, of the unhardened metal member, a part to be a contact part contacting with the separator 90, so that the hardness h1 of the part to be the contact part becomes greater than the hardness h2 of the above-described reference part, to obtain the metal holder 70.

Here, in this example, a method for shaping the metal plate material can be exemplified as follows. First, the plate material is drawn into a hat shape. Thereafter, the top surface of the hat is stamped into a shape in which the inner extending portions 73 and the support portions 74 are developed, and further, a predetermined part of a flange portion of the hat is cut. Thereafter, a lower die is placed on the lower side (front side) of the inner extending portions 73 and the support portions 74, and then an upper die is moved down from the rear side toward the inner extending portions 73 and the support portions 74, whereby these portions are bent inward in the radial direction. The plate material may be first stamped into a disk form having an opening in a shape in which the inner extending portions 73 and the support portions 74 are developed, and then may be drawn into a hat shape. In this way, the unhardened metal member is obtained.

In the drawing work, also the trunk portion of the hat, which will be the reference part, is more or less subjected to work hardening, but is not subjected to the press work for the part to be a contact part described below. Therefore, the degree of work hardening of the trunk portion is less than that of the contact part.

Next, with the lower die kept placed, a punch is pressed on, of the unhardened metal member, only the part to be the contact part contacting with the separator 90, from the upper side toward the lower die, thus performing press work.

As a result, the hardness h1 of the contact part becomes greater than the hardness h2 of the reference part considered to be least work-hardened and exhibiting the maximum thickness, whereby the metal holder 70 of the present embodiment can be obtained.

Next, the first member and the metal holder 70 are assembled so as to contact with each other at the contact parts, whereby the gas sensor 1 can be manufactured.

Needless to say, the present invention is not limited to the above embodiment and includes various modifications and equivalents encompassed in the idea and the scope of the present invention. For example, combination of the first member and the metal member is not limited to the above.

Applicable examples as a sensor include an oxygen sensor, a NOx sensor, and a gas sensor for measuring a gas concentration of HC, $H_2$, etc.

DESCRIPTION OF REFERENCE NUMERALS 1 gas sensor
21 sensor element
24 first member (electrode pad)
40 metal member (metal terminal)
44s contact part (end portion)
44e contact part (slope surface)
70 metal member (metal holder)

71 tubular portion of the metal holder
72a outer bent portion
72b inner bent portion
73 inner extending portion
73s end portion of the inner extending portion
74 support portion
74s contact part (end portion of the support portion)
90, 190 first member (separator)
91 outer side surface of the separator
170 metal member (disc spring)
170s contact part (inner circumferential end)
O axial line

The invention claimed is:

1. A gas sensor comprising:
a first member that is an electrode pad containing ceramic and a noble metal; and
a metal member that has a contact part contacting the first member and a reference part exhibiting a maximum thickness of the metal member, wherein
a hardness h1 of the contact part is greater than a hardness h2 of the reference part,
the metal member is a metal terminal electrically connected to the first member, and
the reference part has a flat shaped portion whose end is folded toward the contact part in a longitudinal direction of the metal member.

2. The gas sensor according to claim 1, wherein
a thickness t1 of the contact part is smaller than a thickness t2 of the reference part.

3. The gas sensor according to claim 1, wherein
the contact part is provided immediately adjacent to an end of the metal member.

4. The gas sensor according to claim 1, wherein
the contact part is tapered.

5. The gas sensor according to claim 1, wherein
the contact part is work-hardened such that the hardness h1 of the contact part becomes greater than the hardness h2 of the reference part.

6. The gas sensor according to claim 1, wherein
the reference part is not subject to work hardening, or is subject to less work hardening than the contact part such that the hardness h1 of the contact part is greater than the hardness h2 of the reference part.

* * * * *